(12) United States Patent
Hori

(10) Patent No.: US 8,708,077 B2
(45) Date of Patent: Apr. 29, 2014

(54) GRILLE SHUTTER APPARATUS

(71) Applicant: Aisin Seiki Kabushiki Kaisha, Kariya (JP)

(72) Inventor: Kenji Hori, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/652,846

(22) Filed: Oct. 16, 2012

(65) Prior Publication Data

US 2013/0092463 A1     Apr. 18, 2013

(30) Foreign Application Priority Data

Oct. 17, 2011   (JP) ................................. 2011-228155

(51) Int. Cl.
    *B60K 11/08*     (2006.01)
(52) U.S. Cl.
    USPC ...................................... 180/68.1; 296/193.1
(58) Field of Classification Search
    USPC .............................. 180/68.1–68.3; 296/193.1
    See application file for complete search history.

(56) References Cited

U.S. PATENT DOCUMENTS

| | | | |
|---|---|---|---|
| 7,866,737 B2 * | 1/2011 | Browne et al. ............. | 296/193.1 |
| 2011/0232981 A1 | 9/2011 | Hori et al. | |
| 2011/0247779 A1 | 10/2011 | Charnesky et al. | |
| 2012/0012410 A1 | 1/2012 | Hori | |
| 2012/0119059 A1 | 5/2012 | Crane et al. | |

FOREIGN PATENT DOCUMENTS

| | | |
|---|---|---|
| JP | 58-139519 U | 9/1983 |
| JP | 2007-1503 | 1/2007 |

OTHER PUBLICATIONS

U.S. Appl. No. 13/653,689, filed Oct. 17, 2012, Hori.
U.S. Appl. No. 13/630,298, filed Sep. 28, 2012.
Extended Search Report issued Jan. 30, 2013 in European Patent Application No. 12188853.1.

* cited by examiner

*Primary Examiner* — Jeffrey J Restifo
*Assistant Examiner* — Erez Gurari
(74) *Attorney, Agent, or Firm* — Oblon, Spivak, McClelland, Maier & Neustadt, L.L.P.

(57) ABSTRACT

A grille shutter apparatus arranged at a grille opening portion at a frontal portion of a vehicle body includes a frame shaping a flow path of air flowing into the vehicle body from the grille opening portion, a movable fin rotationally supported by the frame and configured to control a flow amount of the air by providing an opening movement and a closing movement, the movable fin including a fin portion and rotary shafts rotationally supported by the frame, the rotary shafts including exposure portions configured to be arranged on the flow path of the air, at least one first shielding wall extending radially outward of the rotary shaft and provided at the exposure portion and a second shielding wall arranged at an upstream side of the air that flows in relative to the exposure portion extending in a direction intersecting a direction of the air that flows in.

12 Claims, 6 Drawing Sheets

US 8,708,077 B2

GRILLE SHUTTER APPARATUS

CROSS REFERENCE TO RELATED APPLICATIONS

This application is based on and claims priority under 35 U.S.C. §119 to Japanese Patent Application 2011-228155, filed on Oct. 17, 2011, the entire content of which is incorporated herein by reference.

TECHNICAL FIELD

This disclosure generally relates to a grille shutter apparatus.

BACKGROUND DISCUSSION

Known grille shutter apparatuses configured to control an amount of air that flows into a vehicle body from a grille opening portion by opening and closing movable fins provided at the grille opening portion arranged at a frontal portion of a vehicle body are disclosed, for example, in JPS58-139519U, hereinafter referred to as Reference 1, and JP2007-1503A, hereinafter referred to as Reference 2.

A grille shutter apparatus improves an aerodynamic performance, for example, a drag coefficient (Cd), by limiting the amount of air that flows into the vehicle body by closing the movable fins during, for example, driving the vehicle at high speed. At an engine start, the grille shutter apparatus reduces a warm-up time by limiting the amount of air introduced to a radiator by closing the movable fins. In a state where an engine temperature is increasing, the grille shutter apparatus appropriately adjusts the engine temperature by increasing the amount of air flowing into the engine room by opening the movable fins.

Many of the movable fins provided for a grille shutter apparatus includes rotary shafts being rotationally supported. The movable fins are opened and closed based on rotational movements of the rotary shafts.

Air that flows into the vehicle body through the grille opening portion contains water droplets of, for example, rains and fogs. Accordingly, the water droplets adhered to the movable fins may flow along the rotary shafts and enter bearing portions of the grille shutter apparatus. In order for the movable fins to smoothly operate, a predetermined amount of clearance, or space, is provided between each end of a fin portion of the movable fins and the corresponding bearing portion. In a state where the clearances receive air, the air which in turn hits the bearing portions, the water droplets contained in the air may enter bearing portions. The water droplets may contain foreign objects, for example, dusts, or may turn into ice in the bearing portions, each of which may interfere with a smooth rotation of the rotary shafts at the bearing portions. The known grille shutter apparatuses including the grille shutter apparatuses described in Reference 1 and in Reference 2 leave room for improvement in such respect.

A need thus exists for a grille shutter apparatus, which is not susceptible to the drawback mentioned above.

SUMMARY

A grille shutter apparatus adapted to be arranged at a grille opening portion at a frontal portion of a vehicle body includes a frame shaping a flow path of air flowing into the vehicle body from the grille opening portion, a movable fin rotationally supported by the frame and configured to control a flow amount of the air by providing an opening movement and a closing movement, the movable tin including a fin portion and rotary shafts to be rotationally supported by the frame, the rotary shafts including exposure portions arranged on the flow path of the air, at least one first shielding wall extending radially outward of the rotary shaft and provided at the exposure portion, and a second shielding wall arranged at an upstream side of the air that flows in relative to the exposure portion and extending in a direction intersecting a direction of the air that flows in.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
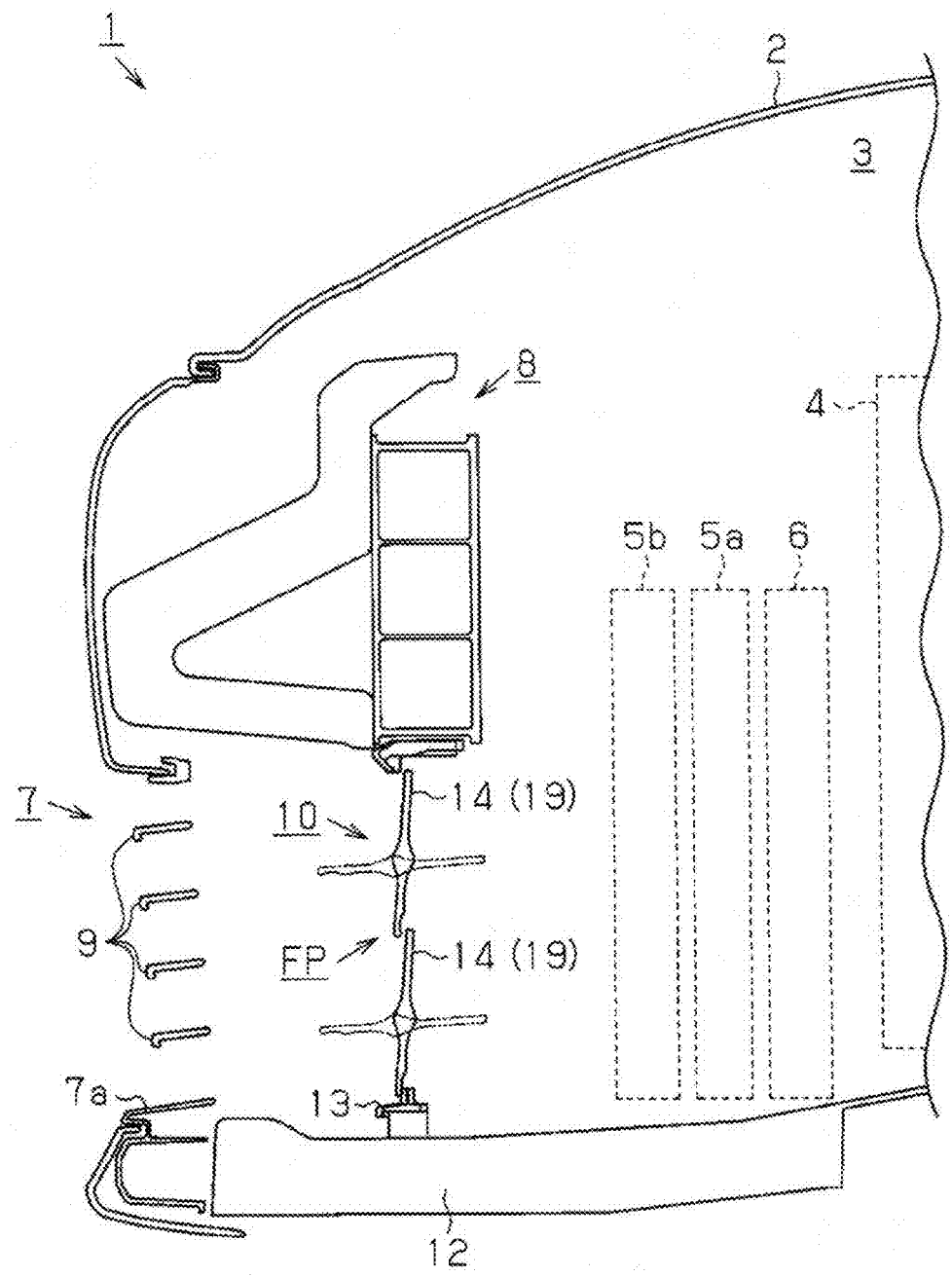
FIG. 1 is a drawing illustrating a general configuration of a grille shutter apparatus described in this disclosure provided on a vehicle.

A grille shutter apparatus 10 according to a first embodiment will be described referring to drawings. FIG. 1 illustrates a vehicle 1 provided with an engine room 3 in a vehicle body 2. The engine room 3 contains a radiator 5a used for cooling an engine 4 and a condenser 5b used for air conditioning. At a frontal portion of the vehicle body 2, which is illustrated at a left end in FIG. 1, a grille opening portion 7 communicating an exterior space in a frontward direction of the vehicle 1 and an internal space of the vehicle body 2 is formed. The radiator 5a and the condenser 5b are arranged frontward of the engine 4 such that the radiator 5a and the condenser 5b receive air that flows into the engine room 3 from the grille opening portion 7.

At a rearward position of the radiator 5a and the condenser 5b, a fan 6 is provided, which is at a position in a right direction of the radiator 5a and the condenser 5b in FIG. 1. The fan 6 rotates so that the air efficiently flows to the radiator 5a and the condenser 5b.

In the grille shutter apparatus 10 according to the first embodiment, the grille opening portion 7 is formed at a downward position relative to a bumper 8. At an opening end 7a of the grille opening portion 7, a grille panel 9 providing a design surface, which is referred to as a lower grille, is attached. The grille shutter apparatus 10 according to the first embodiment provided on the vehicle 1 is configured to control an amount of the air flowing into the engine room 3 from the grille opening portion 7.

In further detail, the grille shutter apparatus 10 includes a frame 13 and a multiple number of movable fins 14. The frame 13 is fixed to a structural body 12 provided at a lower position of the vehicle body 2 such that the frame 13 shapes flow path FP of the air that flows into the vehicle body 2 from the grille opening portion 7. The movable fins 14 are arranged within the framework of the frame 13 such that the movable fins 14 are aligned in lines.

Figure 2:
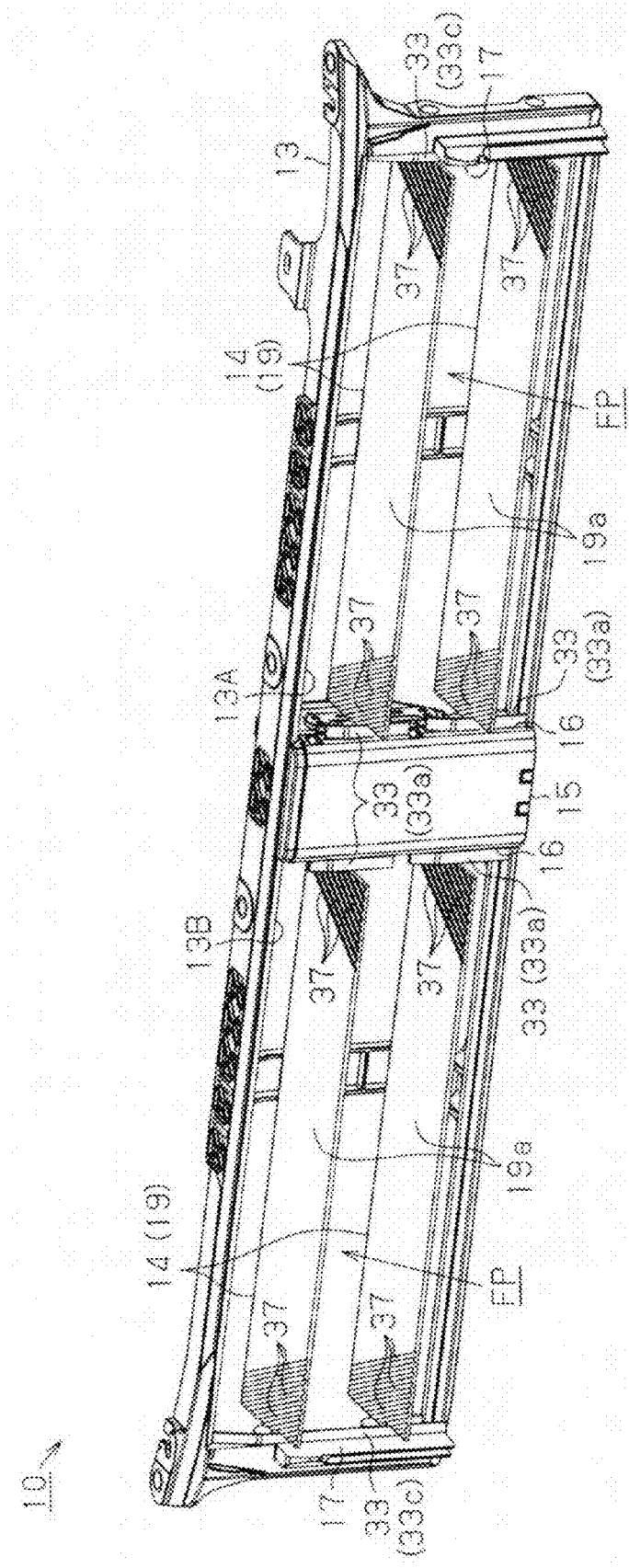
FIG. 2 is a perspective view illustrating the grille shutter apparatus according to a first embodiment.

As FIG. 2 illustrates, the frame 13 is formed in an elongate form extending in a width direction of the vehicle body 2, the form corresponding to the form of the grille opening portion 7 formed as an opening arranged at a frontal portion of a vehicle body 2. Around a center portion in the width direction within the frame 13, an actuator portion 15 formed in a form similar to a column is provided. The actuator portion 15 divides the frame 13 into right and left sections, which are an opening portion 13A and an opening portion 13B. Within each of the opening portions 13A, 133, the movable fins 14 are arranged in two rows parallel to each other in an upward and downward direction of the vehicle 1.

Figure 3:
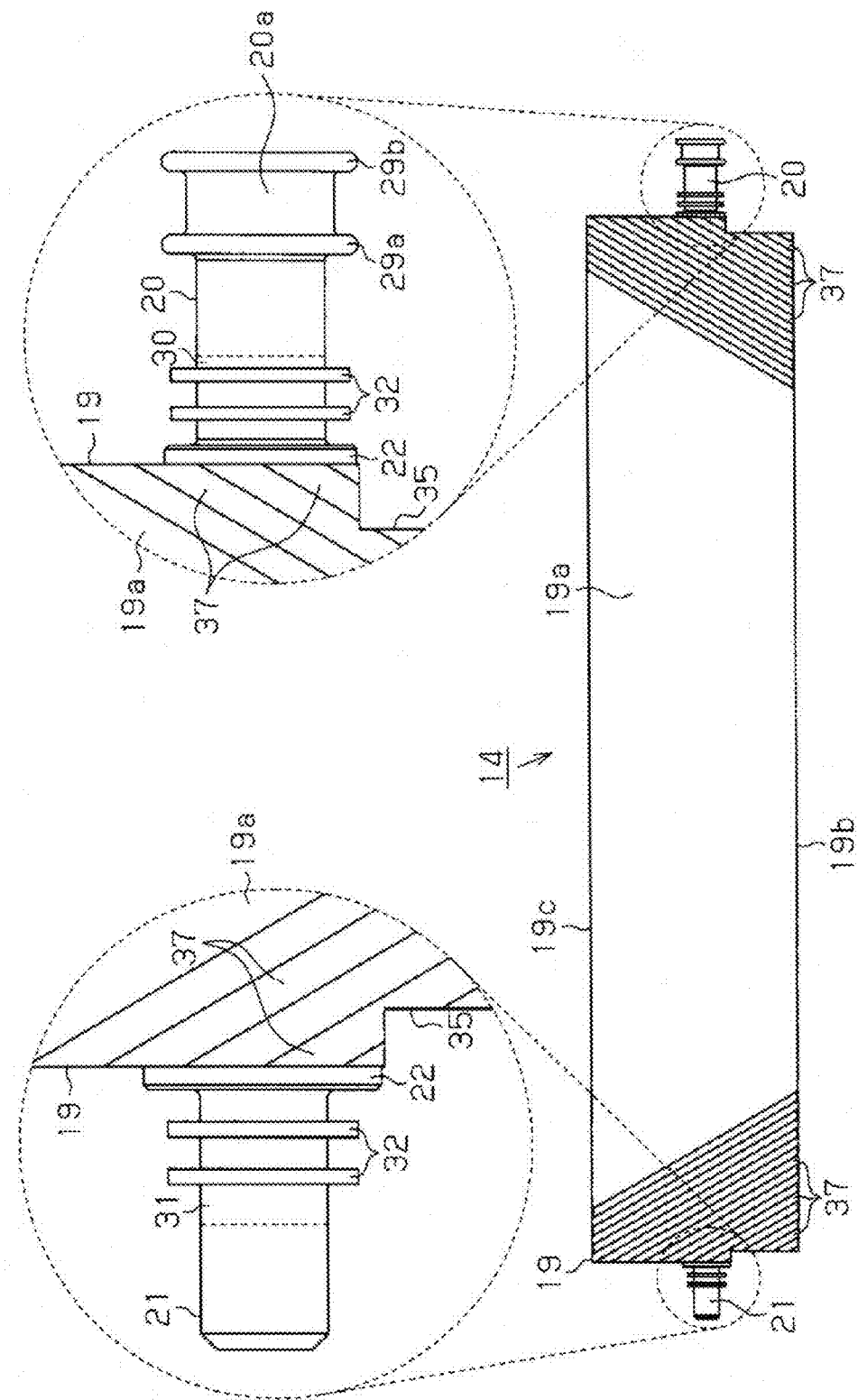
FIG. 3 is a top view of a movable fin provided on the grille shutter apparatus according to the first embodiment.
Figure 4:
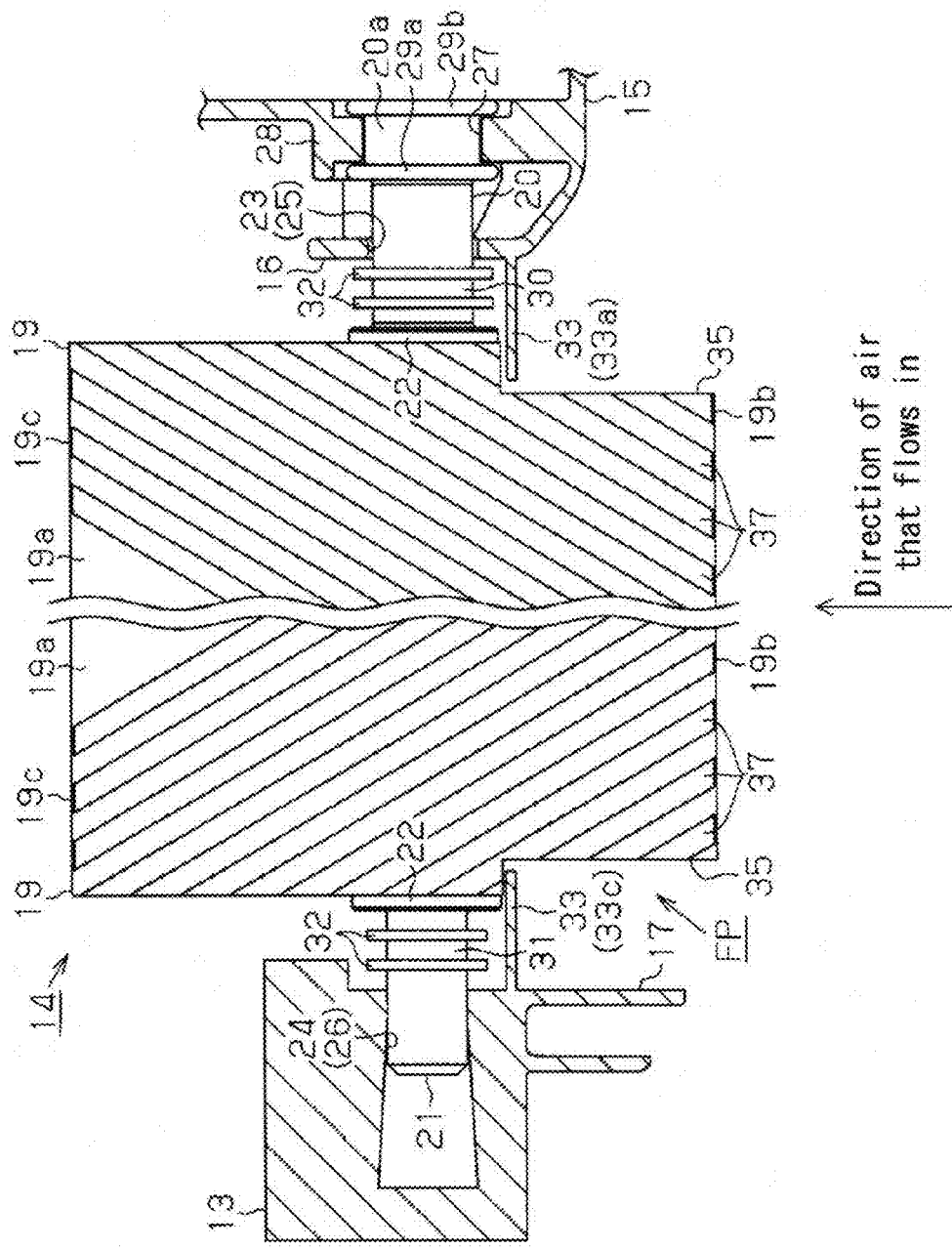
FIG. 4 is a cross-sectional view of bearing portions that receive rotary shafts of the movable fin provided on the grille shutter apparatus according to the first embodiment.

As FIG. 3 illustrates, each of the movable fins 14 includes a fin portion 19 formed in a form similar to a flat elongate plate form extending in the width direction of the frame 13. Each of the fin portions 19 is provided with rotary shafts 20, 21 at opposing ends of the fin portion 19 in the width direction. Each of the rotary shafts 20, 21 extends outward in the width direction from the corresponding end of the fin portion 19. The rotary shafts 20, 21 share a same axis of rotation. More specifically, a connecting portion 22 formed in a form similar to a circular plate is formed at each end of the fin portion 19 in the width direction. Each of the rotary shafts 20, 21 is provided at a central portion of the corresponding connecting portion 22. As FIGS. 2 and 4 illustrate, the movable fins 14 are provided within the opening portions 13A, 13B in a state such that the movable fins 14 may rotate within the opening portions 13A, 13B. The rotary shafts 20, 21 of each of the movable fins 14 are rotationally supported to corresponding bearing portions 23, 24 arranged on side surfaces 16 of the actuator portion 15 and on inner surfaces 17 of the frame 13 opposing the side surfaces 16.

More specifically, as FIG. 4 illustrates, each of the bearing portions 23 provided on the actuator portion 15 is a through-hole 25 extending through the actuator portion 15 extending between the side surfaces 16 of the actuator portion 15. Each of the bearing portions 24 provided on the frame 13 is a hole 26 formed on the inner side surface 17 of the frame 13. Each of the rotary shafts 20, 21 is inserted to the corresponding through-hole 25 or hole 26 so that each of the movable fins 14 is rotationally supported with the rotary shafts 20, 21 as the center of rotation.

Inside the actuator portion 15, plate form portions 28 provided with through-holes 27 are formed. At an end portion 20a of each of the rotary shafts 20, a pair of flanges 29a, 29b separated with a space therebetween in the axial direction are provided. In the grille shutter apparatus 10 according to the first embodiment, the end portion 20a of each of the rotary shafts 20 is inserted to the corresponding through-hole 27. The flanges 29a, 29b sandwiches the corresponding plate form portion 28 therebetween, such that the flanges 29a, 29b restricts a movement of each of the movable fins 14 in the axial direction.

Each of the rotary shafts 20, 21 includes a portion referred to as an exposure portion 30, 31, which is the portion arranged on the flow path FP of the air shaped by the frame 13. In other words, a predetermined amount of clearance, or space, is provided between each of the fin portions 19 and the corresponding side surface 16 of the actuator portion 15 where the bearing portion 23 for the rotary shaft 20 is provided and between each of the fin portions 19 and the corresponding inner side surface 17 of the frame 13 where the bearing portion 24 for the rotary shaft 21 is provided. The clearances of the grille shutter apparatus 10 according to the first embodiment are provided so that each of the movable fins 14 smoothly rotate without the frame 13 and the actuator portion 15 interfering the rotation.

The actuator portion 15 drives each of the rotary shafts 20 rotationally supported to the bearing portions 23, 24. Accordingly, each of the movable fins 14 rotates integrally with the rotary shaft 20. Each of the movable fins 14 is brought to an open state when the movable fin 14 is rotated in a clockwise direction in FIG. 1, which brings the fin portion 19 to a state aligning the direction of the air that flows in from the grille opening portion 7. Each of the movable fins 14 is brought to a closed state when the movable fin 14 is rotated in a counterclockwise direction in FIG. 1, which brings the fin portion 19 to a state intersecting the direction of the air that flows in.

The grille shutter apparatus 10 according to the first embodiment controls the rotations of each of the movable fins 14 described herewith by controlling the actuator portion 15. Based on the opening movement and the closing movement, or the rotations, of each of the movable fins 14, the grille shutter apparatus 10 controls the amount of the air that flows into the engine room 3 from the grille opening portion 7.

An waterproof structure at the bearing portions 23, 24 of the grille shutter apparatus 10 according to the first embodiment will be described next. As FIGS. 3 and 4 illustrate, each of the rotary shafts 20, 21 is provided with a multiple number of flanges 32 spaced apart from one another in the axial direction of the flanges 32. Each of the flanges 32 serves as a first shielding wall. More specifically, two flanges 32 are provided at the exposure portion 30, 31 of each of the rotary shafts 20, 21, the exposure portion 30, 31 arranged on the flow path FP of the air shaped by the frame 13. Each of the flanges 32 is formed in substantially annular plate form, formed to extend radially outward around whole periphery of the exposure portion 30, 31.

As FIGS. 2 and 4 illustrate, within a framework of the frame 13, covers 33 are arranged at an upstream side of the air that flows in relative to the exposure portions 30, 31, such that the covers 33 block the air that flows in from the grille opening portion 7. Each of the covers 33 serves as a second shielding wall.

More specifically, at frontward of the exposure portion 30 of each of the rotary shaft 20, which is the rotary shaft at right in FIG. 4, a cover 33a, which serves as the second shielding wall, in substantially flat plate from is arranged. Each of the covers 33a is provided at the side surface 16 of the actuator portion 15. At frontward of the exposure portion 31 of each of the rotary shaft 21, which is the rotary shaft at left in FIG. 4, a cover 33c, which serves as the second shielding wall in substantially flat plate form is arranged. Each of the covers 33c is provided at the inner side surface 17 of the frame 13. As FIG. 2 illustrates, each of the aforementioned covers 33a, 33c extends in an upward and downward direction of the frame 13, which is the upward and downward direction of the vehicle body 2. In other words, each of the covers 33a, 33c extends in a direction intersecting the direction of the air that flows in, which is a direction from downward to upward in FIG. 4.

Furthermore, cutout portions 35 are formed at opposing ends in the width direction of each of the fin portions 19. Each of the covers 33a, 33c extends in a direction of axis line of the rotary shafts 20, 21 such that a portion of each of the covers 33a, 33c is arranged at the corresponding cutout portion 35.

In other words, movements of water droplets that flow along the rotary shafts 20, 21 from the fin portion 19 to each of the bearing portions 23, 24 are blocked by each of the flanges 32, which serves as the first shielding wall, provided at the exposure portions 30, 31. The air that flows in from the grille opening portion 7 is blocked by each of the covers 33, 33a, 33c, so that the water droplets contained in the airflow is prevented from adhering to the exposure portions 30, 31. The direction each of the covers 33, 33a, 33c extends, which is in the direction intersecting the direction of the air that flows in, is also in a direction that intersect the direction each of the flanges 32 extends, which is radially outward from each of the rotary shafts 20, 21. In other words, each of the flanges 32 and each of the covers 33, 33a, 33c extend in directions such that flanges 32 and covers 33, 33a, 33c intersect with each other. Accordingly the flanges 32 and covers 33, 33a, 33c form an intricate structure referred to as a labyrinth structure. In the grille shutter apparatus 10 according to the first embodiment, the labyrinth structure prevents the water droplets contained in the airflow that flows in from the grille opening portion 7 to contact each of the bearing portions 23, 24.

Figure 5:
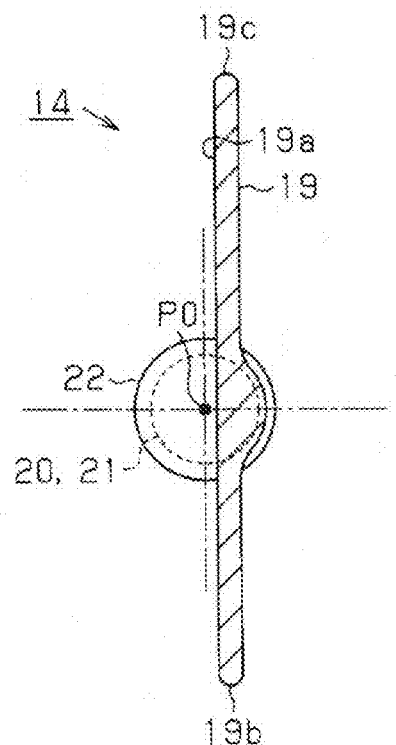
FIG. 5 is a cross-sectional view of the movable fin provided on the grille shutter apparatus according to the first embodiment.
Figure 6:
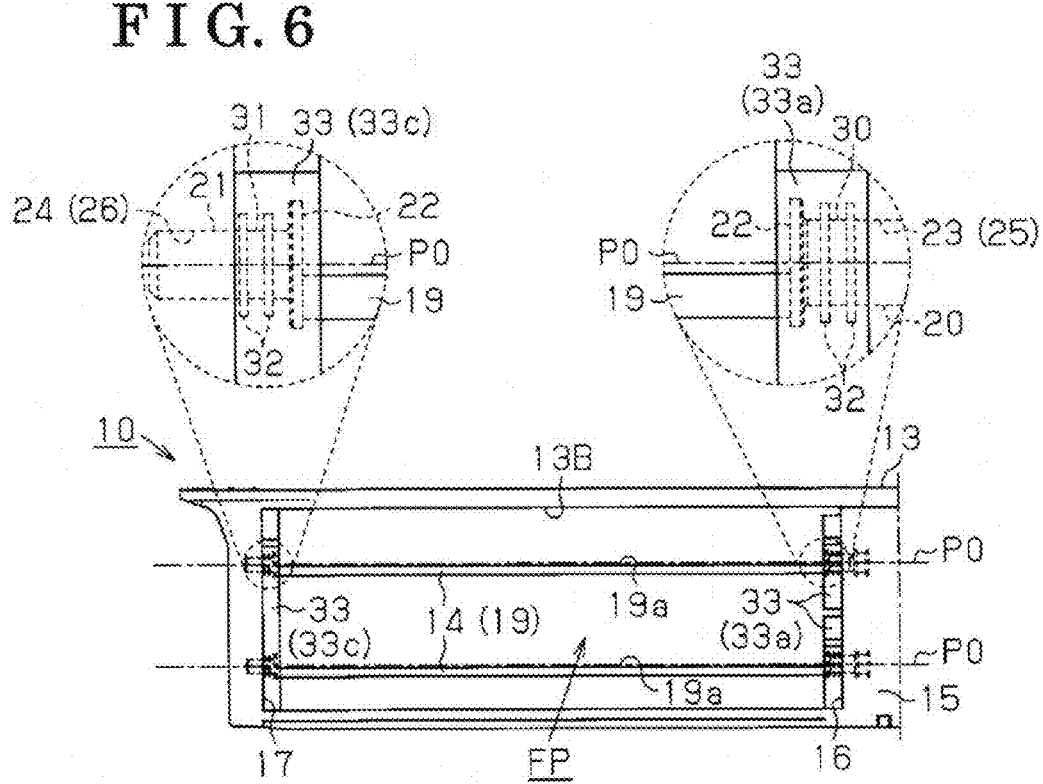
FIG. 6 is a front view illustrating a portion of the grille shutter apparatus according to the first embodiment illustrating a state where the movable fins are at an open state.

As FIG. 5 illustrates, the fin portions 19 of each of the movable fins 14 is arranged at a position off-centered from the rotary shafts 20, 21. More specifically, a rotation axis P0 of each of the rotary shafts 20, 21 is arranged at the central portion of the corresponding connecting portion 22 formed in a circular plate form. On the other hand, the fin portion 19 is arranged at a position displaced near to a rim of the connecting portion 22. As FIG. 6 illustrates, each of the movable fins 14 is provided at a gravitationally downward position relative to the rotation axis P0 of the rotary shafts 20, 21, which is the downward direction in FIG. 6, during the rotary shafts 20, 21 are at a rotational position representing an open state of the movable fins 14.

As FIGS. 2 to 4 illustrate, a multiple number of grooves 37 intersecting the direction of the air that flows in are formed on an upper surface 19a of the fin portion 19 of each of the movable fins 14. More specifically, the grooves 37 are formed near opposing ends in the width direction of each of the fin portions 19. In the grille shutter apparatus 10 according to the first embodiment, each of the movable fins 14 is arranged so that an end portion 19b of the fin portion 19, which is an edge of the fin portion 19 provided in the direction in an upstream side of the air that flows in, is arranged at a gravitationally downward position relative to an end portion 19c, which is an edge of the fin portion 19 provided in the direction in a downstream side of the air that flows in. A downward direction in FIG. 3 represents the upstream side of the air that flows in and an upward direction in FIG. 3 represents the downstream side of the air that flows in. A downward direction in FIG. 6 represents the gravitationally downward direction. The grille shutter apparatus 10 according to the first embodiment is configured so that the movable fins 14 are in the open state during a vehicle speed is low where an effect of wind generated by a running vehicle is low. Each of the grooves 37 extends oblique to the direction of the air that flows in such that the water droplets in each of the grooves 37 flows down toward a central portion of the fin portion 19 by gravity from the opposing ends of the fin portions 19 in the width direction.

The grille shutter apparatus 10 according to the first embodiment is advantageous in following respects. Each of the movable fins 14 includes a fin portion 19 formed in the form similar to the flat elongate plate form and the rotary shafts 20, 21 at opposing ends of the fin portion 19 in the width direction. Each of the rotary shafts 20, 21 includes the exposure portion 30, 31 arranged on the flow path FP of the air. Each of the exposure portions 30, 31 is provided with annular flanges 32 extending radially outward of the rotary shafts 20, 21. At frontward of each of the exposure portions 30, 31, a cover 33 extending in the direction that intersects with the direction of the air that flows in.

Upon the arrangement described herewith, each of the flanges 32, which serves as the first shielding wall, blocks the movement of the water droplets along each of the rotary shafts 20, 21 and prevents the water droplets adhered to the fin portion 19 to enter each of the bearing portions 23, 24. Each of the covers 33, which serves as the second shielding wall, blocks the air that flows in from the grille opening portion 7 and prevents the water droplets contained in the airflow to adhere to each of the exposure portions 30, 31. Furthermore, each of the flanges 32 and each of the covers 33 extend in directions such that the flanges 32 and the covers 33 intersect with each other. Accordingly, the flanges 32 and the covers 33 form the intricate structure referred to as the labyrinth structure. The labyrinth structure prevents the water droplets contained in the air that flows in from the grille opening portion 7 to contact each of the bearing portions 23, 24. As a result, water droplets entering each of the bearing portions 23, 24 is prevented so that consistently reliable smooth opening and closing movements of the movable fins 14 are provided.

Each of the exposure portions 30, 31 is provided with a multiple number of flanges 32 spaced apart from one another in the axial direction. In the grille shutter apparatus 10 according to the first embodiment, two flanges 32 are provide at each of the exposure portions 30, 31. Upon the arrangement described herewith, the movements of the water droplets along each of the rotary shafts 20, 21 are blocked more effectively. Furthermore, in a case where one of the flanges 32, more specifically the flange 32 provided closer to the corresponding bearing portion 23, 24, comes into a contact state with the aforementioned bearing portion 23, 24 as a result of a dimensional error of components or as a result of the movement of the movable fin 14 in the axial direction, the flange 32 provided outward in the direction of the bearing portion 23, 24 works as a stopper that restrains the movement of the movable fin 14 in the axial direction so that the flange 32 provided inward effectively functions as a shielding wall. As a result, entering of water droplets into bearing portions 23, 24 are further effectively prevented.

The fin portion 19 of each of the movable fins 14 is arranged at the position off-centered from the rotation axis P0 of the corresponding rotary shafts 20, 21. The fin portion 19 is provided at the gravitationally downward position relative to the rotation axis P0 of the rotary shafts 20, 21 during the rotary shafts 20, 21 are at the rotational position representing the open state of the movable fin 14.

Upon the arrangement described herewith, the movement of the water droplets adhered to the fin portion 19 from the fin portion 19 to each of the rotary shafts 20, 21 becomes difficult. As a result, entering of water droplets into bearing portions 23, 24 are further effectively prevented.

The upper surface 19a of the fin portion 19 of each of the movable fins 14 is formed with a multiple number of grooves 37 extending in the direction intersecting the direction of the air that flows in from the grille opening portion 7. Each of the grooves 37 extends oblique to the direction of the air that flows in, such that the water droplets in each of the grooves 37 flows down by gravity toward the central portion of the fin portion 19 from the opposing ends of the fin portion 19 in the width direction.

Upon the arrangement described herewith, the water droplets adhered to the fin portion 19 is forced away from nearing each of the rotary shafts 20, 21. Accordingly, the movements of the water droplets along each of the rotary shafts 20, 21 is restrained, and as a result, entering of water droplets into bearing portions 23, 24 are further effectively prevented.

At the opposing ends in the width direction of each of the fin portions 19, cutout portions 35 are formed. The covers 33 extend in the direction of axis line of each of the rotary shafts 20, 21 such that a portion of each of the covers 33 is arranged at the corresponding cutout portion 35.

Extending each of the covers 33 to the portion overlapping with the fin portion 19 along the direction of axis line of each of the rotary shafts 20, 21 further effectively blocks the airflow at the frontward of each of the exposure portions 30, 31. As a result, the amount of the air that flows into each of the clearances defined at the opposing ends of the fin portions 19 in the width direction is reduced.

The grille shutter apparatus 10 according to the first embodiment may be altered in the following manners. In the grille shutter apparatus 10 according to the first embodiment, the air that flows in from the grille opening portion 7 is taken into the engine room 3 formed in the vehicle body 2, however, the place where the air is taken into is not limited to the engine room 3. The air may be taken into any internal space within the vehicle body 2 where each of the movable fins 14 may control the intake amount of the air based on the opening and closing movements of the movable fins 14. For example, the air may be taken into a room for containing the radiator 5a, the condenser 5b, or similar devices provided for exchanging heat. The destination of the air may be any space having an appropriate space for taking in the air from the grille opening portion 7. The grille shutter apparatus 10 according to the first embodiment may be applied to a vehicle with an engine arranged in a middle portion or a rearward portion of the vehicle, or to an electric car, or a similar vehicle, which is provided with an apparatus other than an engine in a room in the direction frontward of the vehicle compartment.

In the grille shutter apparatus 10 according to the first embodiment, the through-hole 25 that extends through the actuator portion 15 between the opposing surfaces of the actuator portion 15 and the holes 26 provided on the inner side surfaces 17 of the frame 13 are configured to provide the bearing portions 23, 24, where the rotary shafts 20, 21 of each of the movable fins 14 are inserted, however, the bearing portions 23, 24 of the rotary shafts 20, 21 may be provided with bearings of other types, for example, plain bearings or rolling bearings.

In the grille shutter apparatus 10 according to the first embodiment, each of the movable fins 14 are configured such that the fin portion 19 of each of the movable fins 14 integrally rotate with the rotary shafts 20, 21 with the rotary shafts 20, 21 as the center of rotation, however, the center of rotation of the movable fins 14 is not limited to the rotary shafts 20, 21. Each of the movable fins 14 of the grille shutter apparatus 10 is provided with rotationally supported rotary shafts and provides opening and closing movements by the rotation of the rotary shafts, however, the opening and closing movements, or the rotation, of the movable fins 14 may be initiated via a swinging arrangement, a sliding arrangement, or other similar arrangements.

In the grille shutter apparatus 10 according to the first embodiment, the movable fins 14 are arranged in two rows in the upward and downward of the vehicle 1 as a set and two sets of the movable fins 14 are arranged side by side with each set arranged in each of the opening portions 13A, 13B of the frame 13 divided by the actuator portion 15. Number of the movable fins is not limited to the arrangement described here. The movable fins may be arranged in three rows or more, for example, or may be arranged in a single row. Furthermore, the amount of airflow may be controlled by opening and closing of a single movable fin.

Furthermore, the position of the actuator portion 15 or the arrangement of movable fins may be altered appropriately. For example, the actuator portion 15 may be arranged at an edge portion of the frame 13 in the width direction. Furthermore, each of the movable fins may be arranged to rotate about the axes at the rotary shafts arranged in the upward and downward direction of the frame 13.

Figure 7:
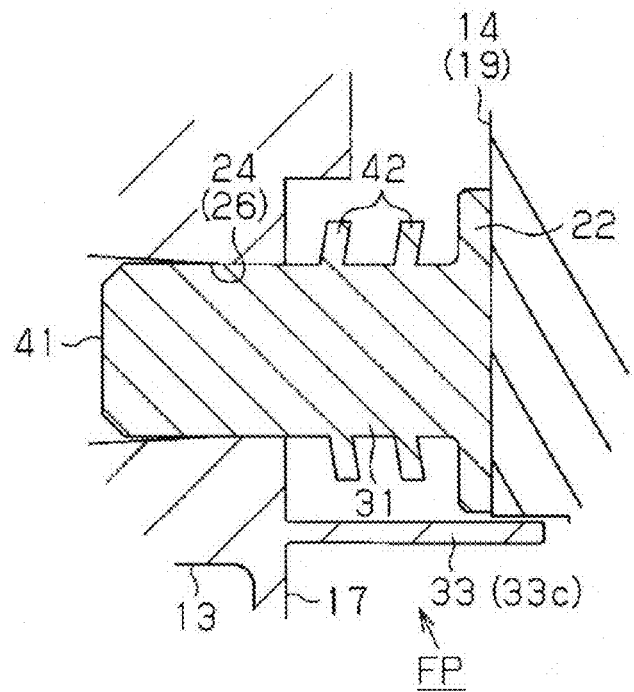
FIG. 7 is a cross-sectional view illustrating another embodiment of flanges provided on a rotary shaft.

In the grille shutter apparatus 10 according to the first embodiment, each of the flanges 32, serving as the first shielding wall, is formed in the annular form and provided at the exposure portion 30, 31 of each of the rotary shafts 20, 21, however, the form of the first shielding wall is not limited to the form as described. The form of each of the first shielding walls provided on the rotary shaft 41 may be an umbrella form, an example of which is illustrated as flanges 42 in FIG. 7, the form that blocks the movements of the water droplets along each of the rotary shafts 20, 21. Furthermore, the shape of each of the first shielding walls viewed in the axial direction of the rotary shafts 20, 21 is not limited to a circle. In order to block the movements of the water droplets along each of the rotary shafts 20, 21, the annular form extending radially outward at the entire periphery of the rotary shafts 20, 21 is effective, however, other arrangements providing a similar shielding characteristic is also allowed. For example, the movements of the water droplets may be shielded by the first shielding walls provided with a form such that restrains the movements of the water droplets by gravitational means or by providing a multiple number of first shielding walls separately provided to block the water droplet movements in every peripheral directions are also allowed.

In the grille shutter apparatus 10 according to the first embodiment, two flanges 32 are provided as the first shielding walls, however, the number of the first shielding walls may be one, three or more. Considering that a state where the flanges 32 coming into contact with the bearing portions 23, 24 may occur, providing the flanges 32 in numbers equal to or more than two is advantageous. Instead of making the flanges 32 come into contact with the bearing portions 23, 24, providing separate stoppers, for example, to make the flanges 32 avoid contact with the bearing portions 23, 24 is also allowed, so that the arrangement for preventing the movements of the water droplets works with a single first shielding wall.

In the grille shutter apparatus 10 according to the first embodiment, each of the rotary shafts 20, the rotary shaft in the direction of the actuator portion 15, and each of the rotary shafts 21, the rotary shaft in the direction of the frame 13, are provided with the flanges 32 and the cover 33 corresponding to each of the rotary shafts 20, 21, however, any one of the rotary shafts may be arranged such that the rotary shaft is provided without the portion serving as the first shielding walls or the second shielding walls. For example, in an arrangement where the length in the width direction of the frame 13 of the grille shutter apparatus 10 is appropriately longer than the length in the width direction of the grille opening portion 7, the bearing portions 24 provided at opposing ends in the width direction of the frame 13 becomes the portion where the air that flows in from the grille opening portion 7, furthermore the water droplets contained in the airflow, is not easily makes contact. Upon the arrangement described herewith, the rotary shaft 21 rotationally supported to the bearing portion 24 may be omitted with the flanges 32 and the cover 33.

In the grille shutter apparatus 10 according to the first embodiment, the covers 33, 33a, 33c, each of which is formed in substantially flat plate form, are provided at frontward of the exposure portions 30, 31 of the rotary shafts 20, 21 as the second shielding walls, however, the form of each of the second shielding walls is not limited to substantially flat plate form. The form of the second shielding wall may be appropriately formed, for example, in a curved plate form, in order to block the air that flows in from the grille opening portion 7 by having a portion that extends in the direction intersecting the direction of the air that flows in from the grille opening portion 7.

In the grille shutter apparatus 10 according to the first embodiment, the cover 33a is formed at each of the side surfaces 16 of the actuator portion 15 and the cover 33c is formed at each of the inner side surfaces 17 of the frame 13, however, the portions where the second shielding walls are formed or fixed to are not limited to the aforementioned locations. For example, the movable fins 14 may be provided with the portions corresponding to the covers 33a, 33c.

In the grille shutter apparatus 10 according to the first embodiment, the cutout portions 35 are formed at the opposing ends in the width direction of each of the fin portions 19. Furthermore, each of the covers 33, which serves as the second shielding wall, extends along the direction of axis line of each of the rotary shafts 20, 21 to the position overlapping with the fin portion 19 such that a portion of each of the covers 33 is arranged at the corresponding cutout portion 35. Each of the covers 33 is arranged frontward of the corresponding exposure portion 30, 31 so that the covers 33 block the airflow in front of the exposure portions 30, 31, however, the cutout portions 35 may or may not be formed on the fin portion for the covers 33 to serve the purpose described herewith. Likewise, the second shielding walls may or may not be provided in a state where each of the second shielding walls overlap with the fin portion 19. Each of the second shielding walls described herewith prevents adhering of the water droplets contained in the airflow that flows in from the grille opening portion 7 at least at the portion on each of the rotary shaft in the direction toward the corresponding bearing portion relative to the first shielding wall. The second shielding walls such that prevent adhering of the water droplets at the entire exposure portions are favorable.

Figure 8:
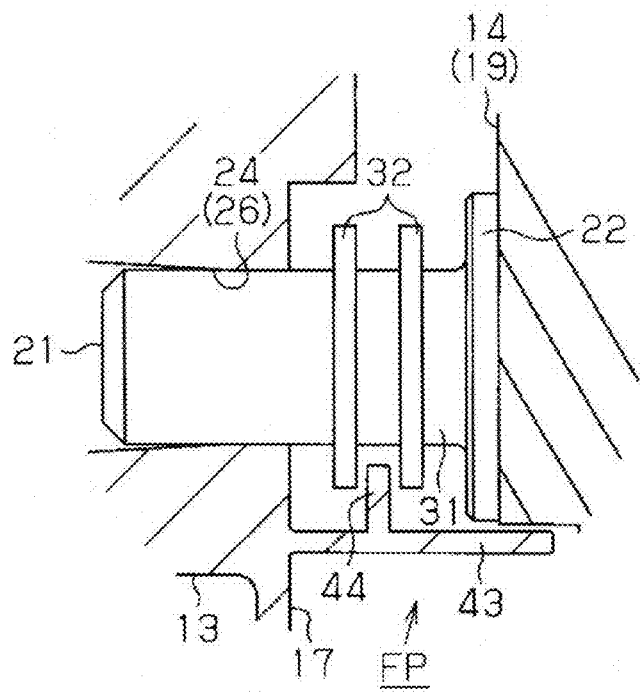
FIG. 8 is a cross-sectional view illustrating another embodiment of a cover provided at frontward of a rotary shaft.

As FIG. 8 illustrates, the grille shutter apparatus 10 according to the first embodiment may be altered by forming an auxiliary wall 44 that extends in the direction toward the rotary shaft 21 on the cover 43 serving as the second shielding wall. Each of the movable fins 14 may be arranged so that the auxiliary wall 44 is arranged between the flanges 32 serving as the first shielding wall. Upon the arrangement herewith, the labyrinth structure formed by the first shielding walls and the second shielding wall becomes a further intricate structure. As a result, the labyrinth structure further effectively prevents the water droplets contained in the air that flows in from the grille opening portion 7 to contact each of the bearing portions 23, 24. The auxiliary wall 44 may be provided in multiple numbers. Each of the auxiliary walls 44 may be provided at a position other than between the flanges 32.

In the grille shutter apparatus 10 according to the embodiment described herewith, each of the grooves 37 formed on the upper surface 19a of the fin portion 19 extends oblique to the direction of the air that flows in such that the water droplets in each of the grooves 37 flows down toward the central portion of the fin portion 19 by gravity from the opposing ands of the fin portion 19 in the width direction. Nevertheless, the direction that each of the grooves 37 extends relative to the direction of the air that flows in from the grille opening portion 7 is not limited to the direction illustrated in FIGS. 2 to 4. The direction that the grooves 37 extend may be altered appropriately according to, for example, the slant angle of the fin portion 19 during the opening movement of the movable fin 14, or according to the condition of the wind that is generated when the vehicle runs. As an alternative, the grooves 37 may be formed with a slanting angle such that the groove 37 allows the water droplets to flow toward the central portion of the fin portion 19 from each of the opposing end portions in the width direction of the fin portion 19 by wind pressure the fin portion 19 receives.

The grille shutter apparatus 10 according to the first embodiment may be provided with a multiple number of protrusions on the upper surface 19a of the fin portion 19, the protrusions extending in the direction that intersect with the direction of the air that flows in. The water droplets may flow in between the protrusions so that the protrusions may function similarly as the grooves 37 where the water droplets flow.

The grille shutter apparatus 10 according to the first embodiment may be provided with a single groove 37 or without grooves 37 on the upper surface 19a of the fin portion 19. The grille shutter apparatus 10 according to the first embodiment may be provided with fin portion 19 that is not arranged at the position off-centered from the rotational axis P0 of the rotary shafts 20, 21. Even without providing the grooves 37 or without the off-centered arrangement of the fin portion 19 being described, providing the first shielding walls and the second shielding walls provide advantages to a certain degree.

According to an aspect of this disclosure, the grille shutter apparatus 10 configured to be arranged at the grille opening portion 7 at the frontal portion of the vehicle body 2 includes the frame 13 shaping the flow path FP of the air flowing into the vehicle body 2 from the grille opening portion 7, the movable fin 14 rotationally supported by the frame 13 and configured to control the flow amount of the air by providing the opening movement and the closing movement, the movable fin 14 including the fin portion 19 and the rotary shafts 20, 21, 41 to be rotationally supported by the frame 13, the rotary shaft 20, 21, 41 including the exposure portions 30, 31 arranged on the flow path FP of the air, at least one flange 32, 42 extending radially outward of the rotary shaft 20, 21, 41 and provided at the exposure portion 30, 31, and the cover 33, 33a, 33c, 43 arranged at the upstream side of the air that flows in relative to the exposure portion 30, 31 and extending in the direction intersecting the direction of the air that flows in.

Accordingly, upon the arrangement described herewith, each of the flanges 32, 42 blocks the movements of the water droplets along each of the rotary shafts 20, 21, 41 and prevents the water droplets adhered to the fin portion 19 to enter each of the bearing portions 23, 24. Each of the covers 33, 33a, 33c, 43 blocks the air that flows in from the grille opening portion 7 and prevents the water droplets contained in the airflow to adhere to each of the exposure portions 30, 31. Furthermore, the direction each of the flanges 32, 42 extends and each of the covers 33, 33a, 330, 43 extends intersect with each other. Accordingly, the flanges 32, 42 and the covers 33, 33a, 33c, 43 form the intricate structure referred to as the labyrinth structure. The labyrinth structure prevents the water droplets contained in the air that flows in from the grille opening portion 7 to contact each of the bearing portions 23, 24. Accordingly, water droplets are prevented from entering each of the bearing portions 23, 24, so that consistently reliable smooth opening and closing operations of the movable fins 14 are provided.

According to another aspect of this disclosure, the grille shutter apparatus 10 is provided with a plurality of flanges 32, 42 spaced apart from one another in the axial direction of the flanges 32, 42.

Upon the arrangement described herewith, the movements of the water droplets along each of the rotary shafts 20, 21 are blocked more effectively. Furthermore, in the case where the flanges 32 provided closest to the corresponding bearing portion 23, 24 comes into the contact state with the aforementioned bearing portion 23, 24 as a result of the dimensional error of components or as a result of the movement of the movable fin 14 in the axial direction, the flange 32 provided outward in the direction of the bearing portion 23, 24 works as the stopper that restrains the movement of the movable fin 14 in the axial direction so that the flange 32 provided inward effectively functions as the shielding wall. As a result, entering of water droplets into bearing portions 23, 24 are further effectively prevented.

According to further aspect of this disclosure, the fin portion 19 of the grille shutter apparatus 10 is arranged off-centered from the rotation axis P0 of the rotary shafts 20, 21, 41 and provided at the gravitationally downward position relative to the rotation axis P0 of the rotary shafts 20, 21, 41 during the rotary shafts 20, 21, 41 are at the rotational position representing the open state of the movable fin 14.

Upon the arrangement described herewith, the movement of the water droplets adhered to the fin portion 19 from the fin portion 19 to each of the rotary shafts 20, 21 becomes difficult. As a result, entering of water droplets into the bearing portions 23, 24 are further effectively prevented.

According to another aspect of this disclosure, the fin portion 19 of the grille shutter apparatus 10 is formed with at least one groove 37 extending in the direction intersecting the axis line of the rotary shafts 20, 21, 41.

By arranging the extending direction of the grooves 37 such that the water droplets in each of the grooves 37 flow down toward a central portion of the fin portion 19 from the opposing ends in the width direction of the fin portion 19 by gravity or by wind pressure, the water droplets adhered to the fin portion 19 is forced away from nearing each of the rotary shafts 20, 21. Accordingly, the movements of the water droplets along each of the rotary shafts 20, 21 is restrained, and as a result, entering of water droplets into the bearing portions 23, 24 are further effectively prevented.

According to further aspect of this disclosure, the cover 33, 33a, 33c, 43 of the grille shutter apparatus 10 extends in the direction of the axis line of the rotary shafts 20, 21, 41 to the position overlapping the fin portion 19.

Accordingly, the flow of the air at the frontward of each of the exposure portions 30, 31 is further effectively blocked. As a result, the amount of the air that flows into the clearances defined at the opposing ends of the fin portions 19 in the width direction is reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A grille shutter apparatus adapted to be arranged at a grille opening portion at a frontal portion of a vehicle body, comprising:
a frame shaping a flow path of air flowing into the vehicle body from the grille opening portion;
a movable fin rotationally supported by the frame and configured to control a flow amount of the air by providing an opening movement and a closing movement;
the movable fin including a fin portion and rotary shafts to be rotationally supported by the frame;
the rotary shafts including exposure portions arranged on the flow path of the air;
first shielding walls extending radially outward of the rotary shafts and respectively provided at the exposure portions; and
a second shielding wall arranged at an upstream side of the air that flows in relative to the exposure portions and extending in a direction intersecting a direction of the air that flows in.

2. The grille shutter apparatus according to claim 1, wherein a plurality of the first shielding walls spaced apart from one another in an axial direction of the first shielding walls are provided.

3. The grille shutter apparatus according to claim 1, wherein the fin portion is arranged off-centered from a rotation axis of the rotary shafts and provided at a gravitationally downward position relative to the rotation axis of the rotary shafts during the rotary shafts are at a rotational position representing an open state of the movable fin.

4. The grille shutter apparatus according to claim 2, wherein the fin portion is arranged off-centered from a rotation axis of the rotary shafts and provided at the gravitationally downward position relative to the rotation axis of the rotary shafts during the rotary shafts are at the rotational position representing the open state of the movable fin.

5. The grille shutter apparatus according to claim 1, wherein the fin portion is formed with at least one groove extending in a direction intersecting an axis line of the rotary shafts.

6. The grille shutter apparatus according to claim 2, wherein the fin portion is formed with at least one groove extending in a direction intersecting an axis line of the rotary shafts.

7. The grille shutter apparatus according to claim 3, wherein the fin portion is formed with at least one groove extending in a direction intersecting an axis line of the rotary shafts.

8. The grille shutter apparatus according to claim 4, wherein the fin portion is formed with at least one groove extending in a direction intersecting an axis line of the rotary shafts.

9. The grille shutter apparatus according to claim 1, wherein the second shielding wall extends in a direction of an axis line of the rotary shafts to a position overlapping the fin portion.

10. The grille shutter apparatus according to claim 2, wherein the second shielding wall extends in a direction of an axis line of the rotary shafts to a position overlapping the fin portion.

11. The grille shutter apparatus according to claim 3, wherein the second shielding wall extends in a direction of an axis line of the rotary shafts to a position overlapping the fin portion.

12. The grille shutter apparatus according to claim 5, wherein the second shielding wall extends in the direction of the axis line of a rotary shafts to a position overlapping the fin portion.

* * * * *